Nov. 5, 1929.  S. E. OVERTON  1,734,340
PIANO BENCH
Filed Nov. 11, 1927
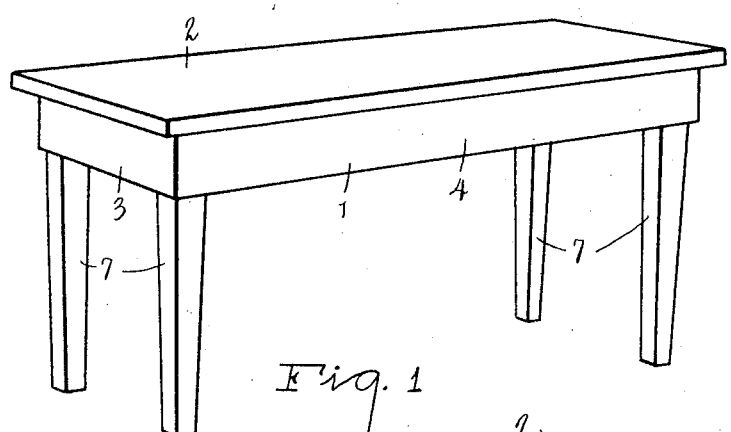
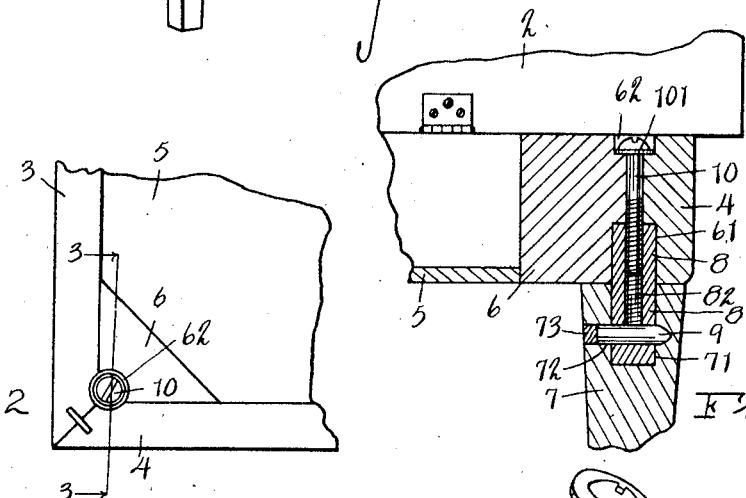
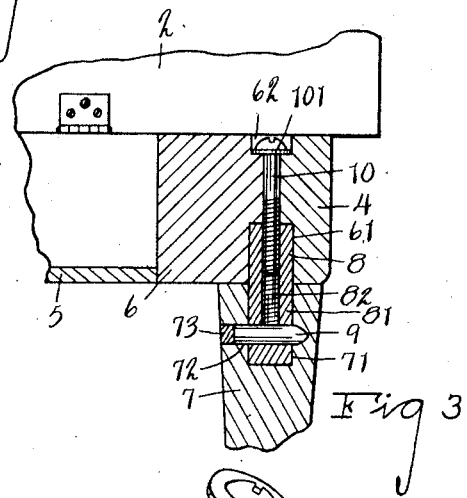
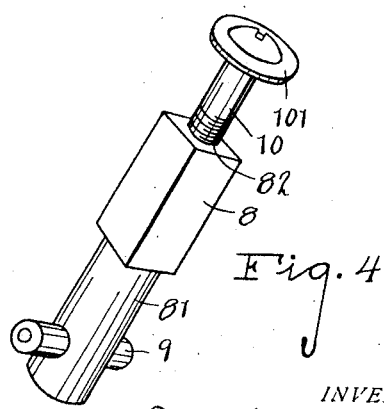
INVENTOR
Samuel E. Overton
BY Chappell & Earl
ATTORNEYS Patented Nov. 5, 1929

1,734,340

UNITED STATES PATENT OFFICE

SAMUEL E. OVERTON, OF SOUTH HAVEN, MICHIGAN

PIANO BENCH

Application filed November 11, 1927. Serial No. 232,592.

This invention relates to improvements in piano benches or seats. The invention is capable of general application.

The main objects of the invention are:

First, to provide an improved knock-down bench or seat in which the separate legs are readily removed or attached and can be readily packed in the box seat.

Second, to provide an improved knock-down structure in which the parts are economically produced, are very strong, and may be effectively assembled or knocked down and packed by an unskilled workman without the aid of tools other than a screw driver.

Third, to provide an improved tenon socket joint for such a structure.

Objects pertaining to details and economies of my invention will definitely appear from the description to follow.

I accomplish the objects of my invention by the devices and means described in the followng specification. The invention is clearly defined and pointed out in the claims.

A device embodying my invention is clearly illustrated in the accompanying drawing which forms a part of this specification, in which:

Fig. 1 is a perspective view of a piano bench embodying the features of my invention.

Fig. 2 is a detail plan view of one corner thereof with the top omitted.

Fig. 3 is a detail vertical section on a line corresponding to line 3—3 of Fig. 2 showing details of the leg tenon socket joint and other structural features.

Fig. 4 is an enlarged detail perspective view of the detached tenon and attaching screw disassembled from the structure.

The parts will be identified by their numerals of reference which are the same in all views.

1 is the rectangular frame or bed of box form provided with a hinged lid 2. 3 are the end pieces, 4 the side pieces and 5 the bottom of the box. 6 is a reinforcing corner block in each corner. 7 are the legs, preferably square. Each leg is provided with a tenon 8 having a round portion 81 disposed in a bore 71 in the upper end of the leg. 9 is a cross pin disposed through a cross bore 72 in the lower end 81 of the tenon and in the upper end of the leg 7, the same being a drive fit and thus coupling the tenon to the leg. A plug 73 is inserted in the end of the bore 72 to conceal the cross pin 9. The tenon 8 projecting above is square and being secured in proper relation in the leg fits into a mortise 61 in the corner block 6.

The tenon 8 has a vertical bore 82 which is screw-threaded to receive the attaching screw 10. A washer 101 is under the head of this attaching screw which is in a depression 62 in the corner block (see Figs. 2 and 3).

It will thus be seen that the legs for my improved bench can have perfectly square tops to which are secured metal tenons which project into the proper mortise in the corner blocks above where they are clamped by socket screws in the sockets formed therein. The lower end of each socket tenon is securely held by a concealed cross pin which is a drive fit in the part.

The tenon may be of any form. Square is preferred especially with a square leg. I show a preferred form of which many modifications are possible.

I wish to claim the invention in the specific form shown and also broadly as pointed out in the appended claims.

Having thus described my invention what I claim as new and desire to secure by Letters Patent is:

1. A bench structure having a body with corner blocks containing mortises, detachable legs each comprising a socket tenon member with a round portion disposed in the top of the legs and with a squared tenon projection above and engaging said mortises, and having a central threaded bore secured in the upper end of each leg by a concealed cross pin, and attaching socket bolts through the corner blocks of the bench frame into said tenon sockets, as specified.

2. A bench structure having a body with corner blocks containing mortises, detachable legs each comprising a socket tenon member with round portion disposed in the top of the leg and with a squared tenon projection above and engaging said mortises and having a central threaded bore secured in the upper end of each leg by a concealed cross pin, and attaching socket bolts through the corner blocks of the bench frame into said tenon sockets, as specified.

3. A bench structure having a body with corner blocks containing mortises, detachable legs each comprising a socket tenon member with round portion disposed in the top of the leg and with a squared tenon projection above and engaging said mortises and having a central threaded bore secured in the upper end of each leg, and attaching socket bolts through the corner blocks of the bench frame into said tenon sockets, as specified.

In witness whereof I have hereunto set my hand.

SAMUEL E. OVERTON.